(12) United States Patent
Martone

(10) Patent No.: US 8,449,398 B2
(45) Date of Patent: May 28, 2013

(54) SECURE, PARALLEL, AND INDEPENDENT SCRIPT EXECUTION

(75) Inventor: Ray Martone, San Francisco, CA (US)

(73) Assignee: Zynga Inc.

( * ) Notice: Subject to any disclaimer, the term of this patent is extended or adjusted under 35 U.S.C. 154(b) by 0 days.

(21) Appl. No.: 13/244,847

(22) Filed: Sep. 26, 2011

(65) Prior Publication Data

US 2012/0283009 A1 Nov. 8, 2012

Related U.S. Application Data

(63) Continuation of application No. 13/100,179, filed on May 3, 2011.

(51) Int. Cl.
*A63F 13/00* (2006.01)

(52) U.S. Cl.
USPC .................................. 463/42; 463/24; 463/29

(58) Field of Classification Search
USPC ................................................. 463/24, 29, 42
See application file for complete search history.

(56) References Cited

U.S. PATENT DOCUMENTS

| | | | | |
|---|---|---|---|---|
| 7,437,614 | B2 * | 10/2008 | Haswell et al. | 714/38.13 |
| 2007/0094041 | A1 * | 4/2007 | Coale et al. | 705/1 |
| 2009/0241037 | A1 * | 9/2009 | Hyndman | 715/757 |
| 2010/0174774 | A1 * | 7/2010 | Kern et al. | 709/203 |
| 2010/0285880 | A1 * | 11/2010 | Crocker | 463/36 |
| 2010/0306652 | A1 * | 12/2010 | Bolger et al. | 715/706 |
| 2011/0063287 | A1 * | 3/2011 | McNeill | 345/419 |

OTHER PUBLICATIONS

"U.S. Appl. No. 13/244,843, Examiner Interview Summary mailed Apr. 10, 2012", 3pgs.
"U.S. Appl. No. 13/244,843, Non Final Office Action mailed Jan. 19, 2012", 7 pgs.
"U.S. Appl. No. 13/244,843, Non Final Office Action Response filed Apr. 18, 2012 response to Non Final Office Action mailed Jan. 19, 2012", 11 pgs.

* cited by examiner

*Primary Examiner* — James S McClellan
(74) *Attorney, Agent, or Firm* — Schwegman, Lundberg & Woessner, P.A.

(57) ABSTRACT

In examples presented herein, a game server and a client device may perform parallel execution of scripts for a computer-implemented virtual game. In one example, in response to determining that a user of a virtual game has performed an in-game action, a first event script to execute is determined based on the in-game action. The first event script is executed to present an in-game effect to the user. After the execution of the first event script, an update notification is sent to a server computer. The update notification indicates the in-game action and client-side state information. An update response is received from the server computer based on execution of a second event script responsive to the in-game action.

20 Claims, 8 Drawing Sheets

SECURE, PARALLEL, AND INDEPENDENT SCRIPT EXECUTION

RELATED APPLICATIONS

This application is a continuation of U.S. patent application Ser. No. 13/100,179, entitled "SECURE, PARALLEL, AND INDEPENDENT SCRIPT EXECUTION," filed May 3, 2011, which is hereby incorporated herein by reference in its entirety.

TECHNICAL FIELD

The present disclosure relates to executing scripts in games and applications. In an example embodiment, a client device and a game server may independently execute scripts in parallel for a computer-implemented virtual game.

BACKGROUND

Computer-implemented online games allow players to meet and interact with other players within a virtual environment. A player may access an online game using a variety of computing devices, for example by accessing a Website for the online game using a Web browser. Moreover, a computing device may present the online game to the player by executing scripts for the online game. For example, one player may visit a virtual city of the online game, and may initiate a battle with a character of this virtual city. To perform this battle, the player's client computing device may execute a local script (e.g., JavaScript) that generates a visual representation of the battle.

This client-side implementation for game events allows the client computing device to react to the player's command in near real-time, which is important for allowing the player to feel immersed within the online game. As the player issues a command to attack the character, the client device may compute an outcome of the battle, and may immediately present a visual representation of the outcome to the player. Unfortunately, this type of implementation for an online game may allow the player to modify scripts and/or game state information at the client computing device to obtain additional in-game resources.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Embodiments of the present invention provide a computer-implemented virtual game that allows a plurality of players at various locations to interact within a virtual environment. During game play, a player's client device may execute an event script to present in-game effects to the player, and to update game state information at the client device. In some embodiments, an event script is a platform-independent binary image that may be executed by a client device and a game server. Moreover, an event script may include references to at least one effect script that implements an in-game effect. In some embodiments, an effect script for a client device may be implemented using ActionScript, and an effect script for a game server may be implemented using PHP: Hypertext Preprocessor (PHP).

For example, when the player performs an in-game action, the client device may receive a corresponding event script for this in-game action from a game server, and the client device may execute the event script to present the in-game effect to the player. This event script may cause the client device to execute a client-side effect script that modifies the game state at the client device, and presents the in-game effect to the player.

Moreover, as the game state changes while the player continues to play the game, the game server needs to maintain an up-to-date local and secure copy of the client device's game state. The game server may use this secure game state to determine in-game resources it needs to provide to the client device, and to determine how to handle synchronous or asynchronous in-game interactions between different players at different client devices. In some embodiments, the game server may maintain the secure game state by executing the event script when the game server receives a notification of an in-game action that the player performed at the client device. For example, when the player plants a new crop within a virtual farm, the client device may inform the game server of this action so that the game server may execute a corresponding event script to update the secure game state to account for this new crop.

Example System

Figure 1:
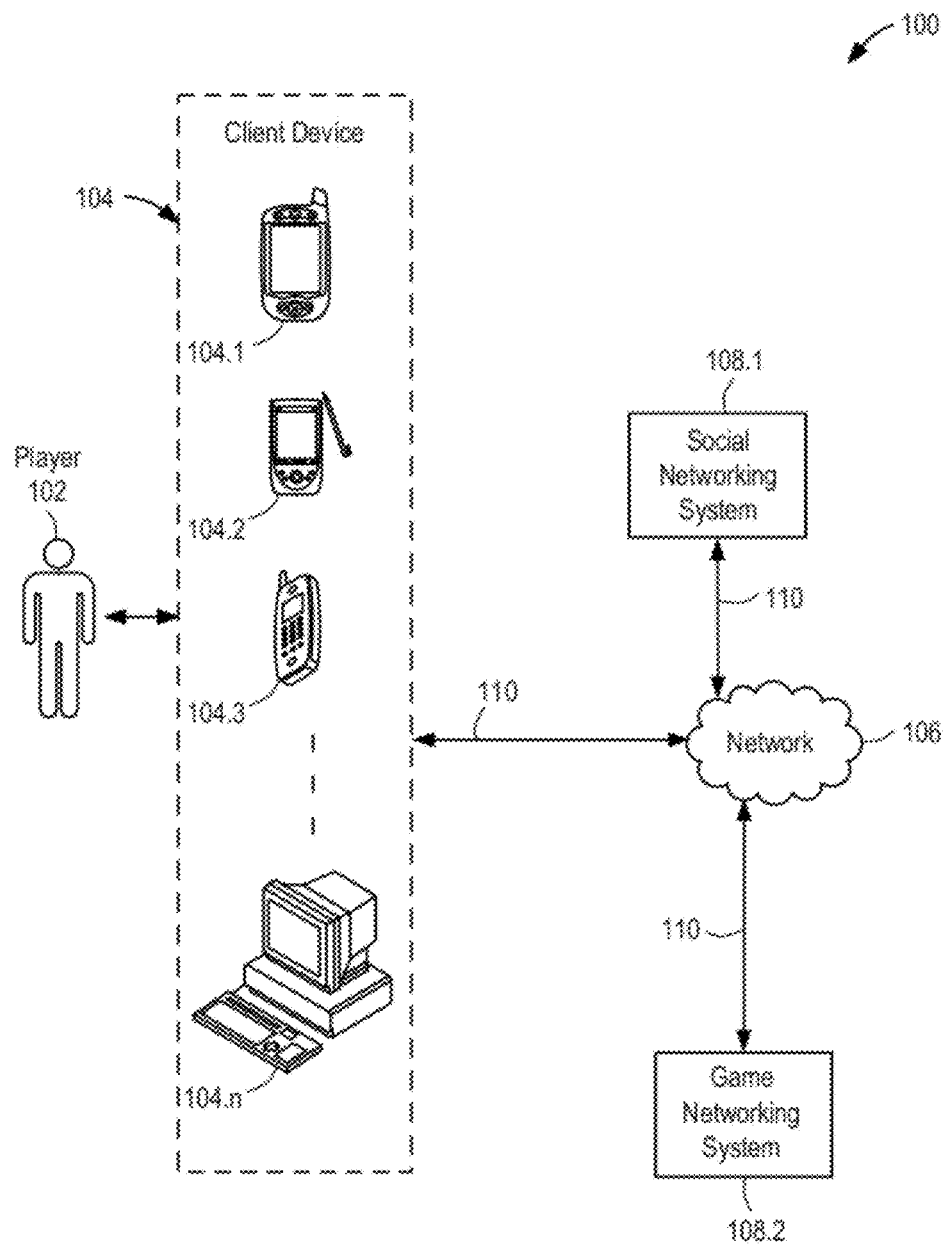
FIG. 1 illustrates an example of a system for implementing various disclosed embodiments.

FIG. 1 illustrates an example of a system 100 for implementing various example embodiments. In some embodiments, the system 100 comprises a player 102, a client device 104, a network 106, a social networking system 108.1, and a game networking system 108.2. The components of the system 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The client device 104 may be any suitable computing device (e.g., devices 104.1-104.n), such as a smart phone 104.1, a personal digital assistant 104.2, a mobile phone 104.3, a personal computer 104.n, a laptop, a computing tablet, or any other device suitable for playing a virtual game. The client device 104 may access the social networking system 108.1 or the game networking system 108.2 directly, via the network 106, or via a third-party system. For example, the client device 104 may access the game networking system 108.2 via the social networking system 108.1. The client device 104 may be any suitable computing device, such as a personal computer, laptop, cellular phone, smart phone, computing tablet, etc.

The social networking system 108.1 may include a network-addressable computing system that can host one or more social graphs (see for example FIG. 2), and may be accessed by the other components of system 100 either directly or via the network 106. The social networking system 108.1 may generate, store, receive, and transmit social networking data. Moreover, the game networking system 108.2 may include a network-addressable computing system (or systems) that can host one or more virtual games, for example, online games. The game networking system 108.2 may generate, store, receive, and transmit game-related data, such as, for example, game account data, game input, game state data, and game displays. The game networking system 108.2 may be accessed by the other components of system 100 either directly or via the network 106. The player 102 may use the client device 104 to access, send data to, and receive data from the social networking system 108.1 and/or the game networking system 108.2. In various example embodiments, the client device 104 and the game networking system 108.2 may independently execute related scripts in parallel for the virtual game.

Although FIG. 1 illustrates a particular example of the arrangement of the player 102, the client device 104, the social networking system 108.1, the game networking system 108.2, and the network 106, this disclosure includes any suitable arrangement or configuration of the these components of the system 100.

Parallel Script Execution

Figures 2A, 2B:
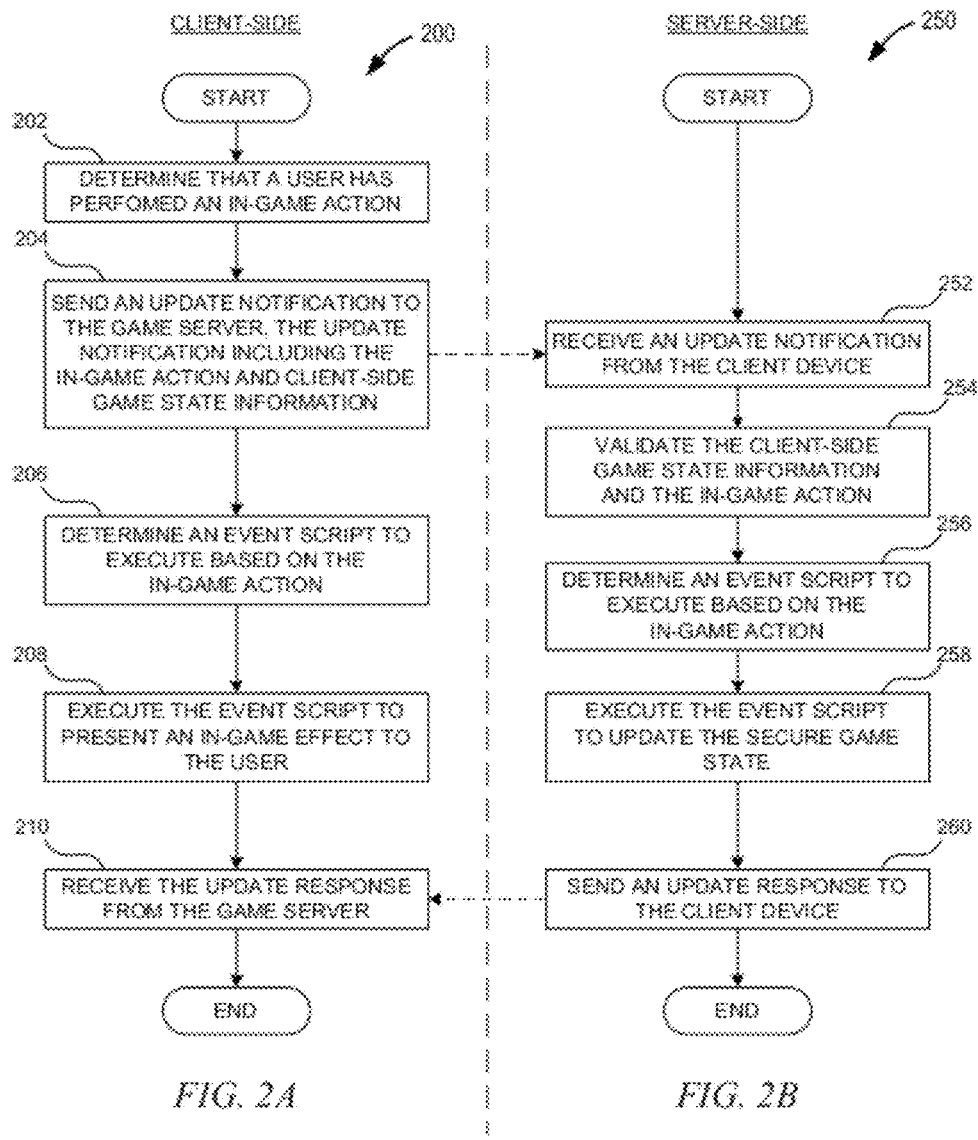
FIG. 2A shows a flowchart illustrating an example method for executing a script at a client device of a computer-implemented virtual game.
FIG. 2B shows a flowchart illustrating an example method for executing a script at a game server of the virtual game.

FIG. 2A shows a flowchart illustrating an example method 200 for executing a script at a client device of the virtual game. In some embodiments, the method 200 may be performed using the client device 104, and, accordingly, is described by way of example with reference thereto. The method 200 may begin at operation 202 by determining that the player has performed an in-game action. Based on the player's in-game action, the method 200 may send an update notification to the game networking system 108.2 at operation 204. This update notification may include an indication of the in-game action performed by the player, and may also include client-side game state information. For example, when the player plants a crop within a virtual farm, the method 200 may send an update notification to the game networking system 108.2 that informs the game server of this crop-planting event, and that includes an amount of virtual currency and/or energy that the player has before planting the new crop.

At operation 206, the method 200 may determine an event script to execute based on the player's in-game action, and may execute the event script at operation 208. For example, the method 200 may use an event database to determine an event trigger that has a triggering condition matching the player's in-game action, and may determine that the event trigger indicates that the event script is to be executed based on this triggering condition. In various embodiments, the event script may include a call to an effect script for the in-game effect. Thus, when the method 200 is executing the event script at operation 208, the method 200 may execute the effect script at the client device 104 to generate updated client-side game state information and to present the in-game effect to the player (e.g., present a crop being planted).

At operation 210, the method 200 may receive an update response from the game networking system 108.2. In various embodiments, this update response may include a game resource selected by the game networking system 108.2 based on a secure game state at the game networking system 108.2. In various embodiments, the game networking system 108.2 may select the game resource either before or after updating the secure game state using an event script associated with the player's in-game action. As an example, the update response may include an event script and/or an effect script that the client device 104 is to execute to present the crop-planting effect to the player. As another example, the update response may include an indication that the update notification from the client device 104 is not valid, which may cause the method 200 to terminate the virtual game.

In various example embodiments, the method 200 may determine an event script to execute in near real-time to when the player performs an in-game action that triggers the event script. For example, the method 200 may use the trigger conditions of a stored event script to determine when it needs to execute this event script. Therefore, as the player performs an in-game action that triggers this event script, the method 200 may perform operations 206 and 208 before sending an update notification to the game networking system 108.2 (e.g., before operation 204) and/or before receiving an update response from the game networking system 108.2 (e.g., before operation 210).

In some example embodiments, the method 200 may receive an event script on-demand from the game networking system 108.2. For example, the method 200 may receive an update response from the game networking system 108.2 that includes an event script that is missing at the client device 104, and is triggered by the player's in-game action. Therefore, the method 200 may perform operations 206 and 208, after receiving the on-demand event script at operation 210, to determine whether the received event script is triggered by the player's in game action and/or to execute the event script.

In some embodiments, the player's in-game action may be one of: an entry into a new in-game location by the player's avatar; a determinable amount of progress at an in-game job by the player; a commencement of a quest by the player; a completion of a quest by the player; and a mouse-click event on an in-game object by the player.

In some embodiments, the event script that is executed by the client device 104 may be associated with the event script that is executed by the game networking system 108.2. For example, the event script for the client device 104 may include at least a subset of the instructions found in the event script for the game networking system 108.2, or may be an exact copy of the event script for the game networking system 108.2.

FIG. 2B shows a flowchart illustrating an example method 250 for executing a script at a game server of the virtual game. In some embodiments, the method 250 may be performed using the game networking server 108.2, and, accordingly, is described by way of example with reference thereto. The method 250 may begin at operation 252 by receiving an update notification from the client device 104. This update notification may include an indication of the in-game action performed by the player of the client device 104, and may also include client-side game state information.

Next, the method 250 may validate the client-side game state information and the player's in-game action at operation 254 to generate a validation result. During operation 254, the method 250 may compare the client-side game state information to a secure game state stored at the game networking system 108.2 to determine whether they match. The method 250 may also determine whether the player is allowed to perform the in-game action. If the client-side game state information matches the secure game state and the player is allowed to perform the in-game action, the method 250 may generate a validation result that indicates that the update notification is valid. Otherwise, the method 250 may generate a validation result that indicates that the update notification is invalid, or that the player is not allowed to perform the in-game action. In some embodiments, the secure game state may be stored on a database that is accessible by the game networking system 108.2 either directly or via the network 106.

For example, the player may attempt to cheat by modifying client-side game state information to increase an amount of virtual currency or game energy that is attributed to the player. Then, during operation 254, the method 250 may detect the player's attempt to cheat by determining that the amount of virtual currency or energy in the client-side game state does not match that of the secure game state. In another example, the player may attempt to cheat by modifying a script stored at the client device 104 so that the script does not check how much virtual currency or energy the player's avatar has before planting a crop. Then, during operation 254, the method 250 may detect the player's attempt to cheat by determining that the player does not have enough virtual currency or energy to perform the in-game action.

If the validation result indicates that the update notification is valid, the method 250 may continue to operation 256 to determine an event script to execute based on the in-game action. For example, during operation 256, the method 250 may use an event database to determine an event trigger that has a triggering condition matching the in-game action, and may determine that the event trigger indicates that the event script is to be executed based on the triggering condition.

Moreover, the method 250 may execute the event script at operation 258 to update the secure game state, and may send an update response to the client device 104 at operation 260. In some embodiments, the update response may include the validation result, an event script that is to be used by the client device to present an in-game effect to the player, and/or any resource that the client device needs to use to present the in-game effect. As an example, the update response may include an event script and/or a resource embedded within the update response as text or as a binary large object (BLOB). As another example, the update response may include a reference (e.g., a universal resource locator (URL) reference) to an event/script and/or a resource that the client device uses to retrieve this information via a separate HTTP request). Furthermore, the event script in the update response may be associated with the event script being executed by the method 250 at operation 258. For example, the event script in the update response may include at least a subset of the operations of the event script being executed by the game networking system 108.2.

However, if the validation result indicates that the client-side game state information is not valid, the method 250 may send an update response to the client device 104 indicating that the update notification is invalid, without performing operation 256 or operation 258.

In various embodiments, the method 250 may determine an event script to execute (e.g., at operation 256) independent of the client device 104 determining an event script to execute (e.g., at operation 206). Further, the method 250 may execute this event script (e.g., operation 258) at the game networking system 108.2 in parallel to the client device 104 executing the second event script (e.g., operation 208). Thus, when the player performs an in-game action that causes the virtual game to display an in-game effect to the player, the game networking system 108.2 may update the secure game state in response to this in-game action independent of the client device 104 presenting the in-game effect and updating its client-side game state.

Client Device

Figure 3:
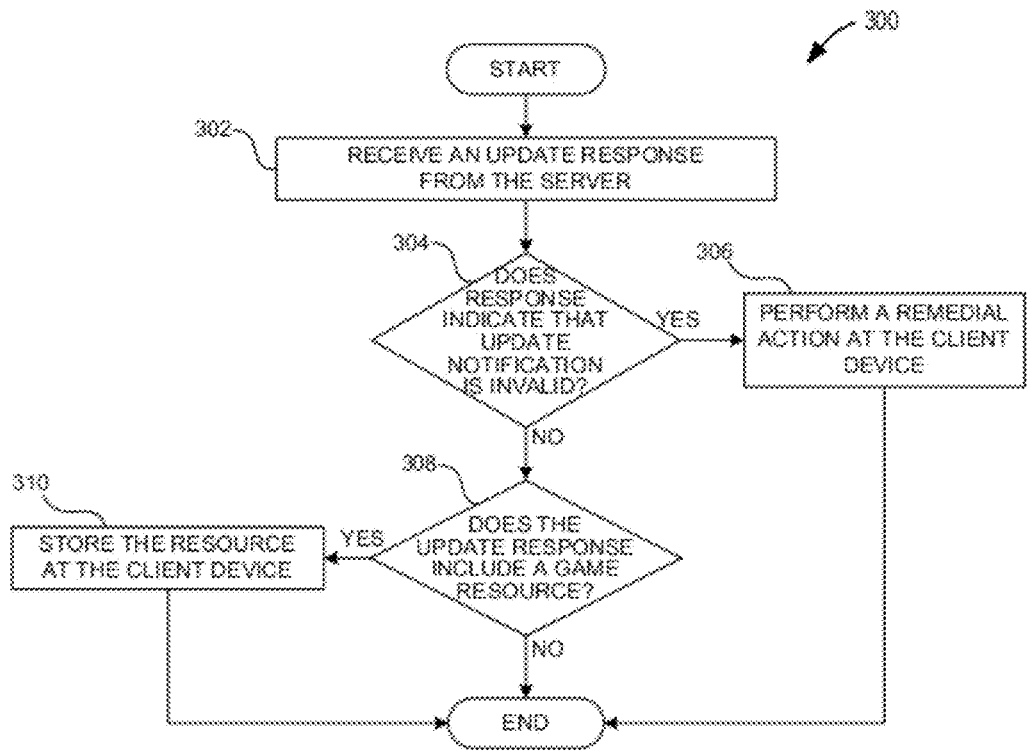
FIG. 3 shows a flowchart illustrating an example method for processing an update response from the game server of the virtual game.

FIG. 3 shows a flowchart illustrating an example method 300 for processing an update response from a game server of the virtual game. In some embodiments, the method 300 may be performed using the client device 104, and, accordingly, is described by way of example with reference thereto. The method 300 may begin at operation 302 by receiving the update response from the game networking system 108.2. Next, the method 300 determines at operation 304 whether the update response indicates that the update notification is invalid.

If the method 300 determines that the response indicates that the update notification is invalid, the method 300 may perform a remedial action at operation 306. For example, the method 300 may perform a remedial action that terminates the virtual game, or that loads the secure game state from the game networking system 108.2. Otherwise, if the update response indicates that the update notification is valid, the method 300 may continue to operation 308 to determine whether the update response includes a resource of the virtual game. For example, the update response may include an explicit indication that the update notification is valid. As another example, the update response may not include an explicit indication that the update notification is valid or invalid, which the method 300 may interpret to mean that the client-side game state is valid.

If at operation 308 the method 300 determines that the update response does not include a game resource, the method 300 may end. Otherwise, if the method 300 determines that the update response includes a game resource, the method 300 may continue to operation 310 to store the resource. For example, the update response may include the resource embedded within the update response as text or as a BLOB, and the method 300 extracts the resource from the response at operation 310. As another example, the update response may include a reference (e.g., a URL reference) to the resource, and the method 300 may use the reference at operation 310 to retrieve the resource (e.g., via a separate HTTP request).

Game Server

Figure 4:
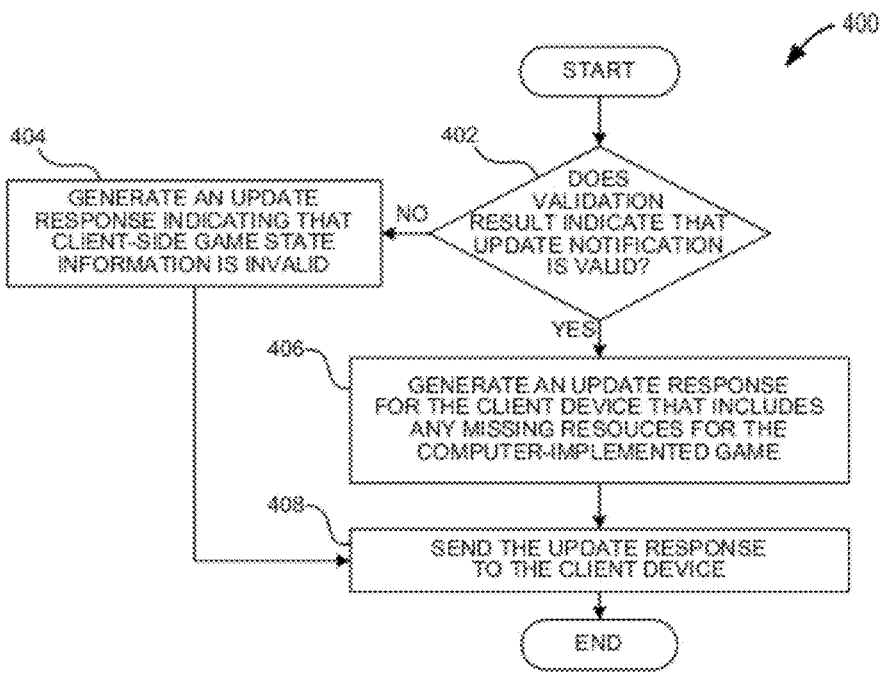
FIG. 4 shows a flowchart illustrating an example method for generating an update response for a client device of the virtual game.

FIG. 4 shows a flowchart illustrating an example method 400 for generating an update response for a client device of the virtual game. In some embodiments, the method 400 may be performed using the game networking system 108.2, and, accordingly, is described by way of example with reference thereto. The method 400 may begin at operation 402 by determining whether the validation result generated at operation 254 (FIG. 2) indicates that the update notification is valid.

If the method 400 determines that the update notification is not valid, the method 400 may continue to operation 404 to generate an update response indicating that the client-side game state information is invalid. The method 400 may then send the update response to the client device 104 at operation 408. For example, the method 400 may generate the update response so that it indicates an error status.

Otherwise, if the method 400 determines at operation 402 that the update notification is valid, the method 400 may continue to operation 406 to generate an update response for the client device 104 that includes in-game resources for the client device 104. Then, the method 400 may continue to operation 408 to send the update response to the client device 104. For example, the method 400 may generate the update response so that it indicates an OK status (e.g., HTTP "OK").

In some embodiments, the method 400 may use the secure game state to determine which game resources have not been sent to the client device 104, and may include these missing resources in the update response. For example, the method 400 may generate the update response so that it includes a resource as text or BLOB information. Also, the method 400 may generate the update response so that it includes references to in-game resources (e.g., a URL reference), and the client device 104 may send a separate request to download any of these referenced resources when it needs them.

Developing and Deploying an Effect Script

In some embodiments, a game developer may implement a description for an in-game effect using a programming language (e.g., using the C programming language, or a proprietary programming language). This description may include a set of instructions that describe how the in-game effect is to be presented, and may include a set of instructions that update game state information. In various embodiments, a description for an in-game effect may itself be implemented using one or more other in-game effects. Therefore, a developer is able to use existing in-game effects to design new descriptions for complex in-game effects.

The game server may compile the description for the in-game effect into two separate effect scripts that are optimized for the client device 104 and the game networking server 108.2. For example, the client-side effect script may include a set of ActionScript instructions that present an in-game effect to the player, and then update the client-side game state to account for the in-game effect. Moreover, the server-side effect script may include a corresponding set of PHP instructions that may update the secure game state to account for the in-game effect, but may not include a set of instructions associated with the presenting of the in-game effect.

Figure 5:
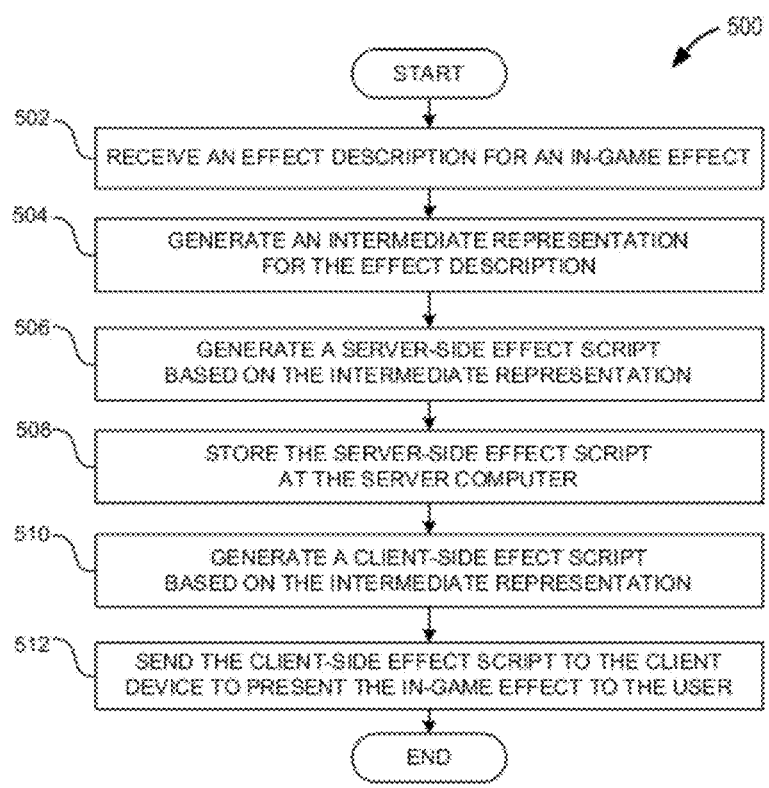
FIG. 5 shows a flowchart illustrating an example method to process a description for an in-game effect of the virtual game.

FIG. 5 shows a flowchart illustrating an example method 500 to process a description for an in-game effect of the virtual game. In some embodiments, the method 500 may be performed using the game networking system 108.2, and, accordingly, is described by way of example with reference thereto. The method 500 may begin at operation 502 by receiving an effect description for an in-game effect. Next, the method 500 may generate an intermediate representation for the effect description at operation 504.

At operation 506, the method 500 may generate a server-side effect script based on the intermediate representation, and at operation 508, the method 500 may store the server-side effect script at a storage device of the game networking system 108.2. In some embodiments, the server-side effect script may include a first set of operations that are to be executed by the game networking system 108.2 to update the secure game state. Moreover, the event script determined by the game networking system 108.2 at operation 256 (FIG. 2) may include a call to an effect script for the in-game effect. Therefore, when the game networking system 108.2 executes the event script at operation 258, the game networking system 108.2 may execute the first set of operations of the server-side effect script.

Then, at operation 510, the method 500 may generate a client-side effect script based on the intermediate representation, and may send the client-side effect script to the client device 104 at operation 512 (e.g., within an update response). In some embodiments, the client-side effect script may include a second set of operations that are to be executed by the client device 104 to present the in-game effect to the player. Moreover, the event script executed by the client device 104 at operation 208 may include a call to an effect script for the in-game effect. Therefore, when the client device 104 executes the event script at operation 208, the client device 104 may execute the second set of operations of the client-side effect script.

Lifetime of an Event Script

In some embodiments, an event script may include a keep-alive statement, which when executed by a computing device (e.g., client device 104 or the game networking system 108.2), causes the computing device to not disable the event script. This keep-alive statement allows a developer to program the explicit conditions that cause an event script to remain enabled after script execution. Also, if the computing device does not encounter a keep-alive statement when executing the event script (e.g., at operation 208 or at operation 258), the computing device may automatically disable the event script (e.g., by removing or disabling at least the event trigger which caused the event script to execute). This prevents an event script from triggering past its intended lifetime.

For example, the game networking system 108.2 may provide the client device 104 with an event script that causes a building to burn the next time the player's avatar approaches the building. The event script may include a conditional statement that presents a burning building to the player when the player's avatar steps on tile {16, 16}, and otherwise executes a keep-alive statement.

TABLE 1

| 1 | If (event.target.x == 16 && event.target.y == 16) { |
| 2 |    const smallCasino = 200; |
| 3 |    const burnSmallCasino = 43688; |
| 4 |    System.zone.getObjById(smallCasino).job.add(burnSmallCasino); |
| 5 | } else { |
| 6 |    this.keepAlive = true; |
| 7 |  |

Table 1 shows source code for an example event script that causes the client device 104 to present the burning building in-game effect. In some embodiments, the event script is executed by the client device 104 during operation 208 or by the game networking system 108.2 during operation 258. The event script includes a conditional statement that causes the computing device to execute an effect script for the burning building when the player's avatar enters tile {16, 16}. Line 1 includes a triggering condition for the effect script as the predicate to the conditional statement. Also, line 4 includes a statement that causes the burning building effect script to execute. The first portion of line 4 (e.g., "System.zone.getObjById(smallCasino)") causes the computing device to access a casino object with a reference ID of 200. Moreover, the last portion of line 4 (e.g., "job.add(burnSmallCasino)") causes the computing device to add the burning building effect script with a reference ID of 43688 to the casino object.

In some example embodiments, if the computing device executes the consequent of the conditional statement (e.g., lines 2-4), the computing device processes the effect script for the burning building effect, and disables this event script after executing the event script. However, if the computing device executes the alternative of the conditional statement (e.g., line 6), the computing device executes a keep-alive statement, and does not disable the event script after executing the event script (e.g., after operation 208, or 258).

Figure 6A:
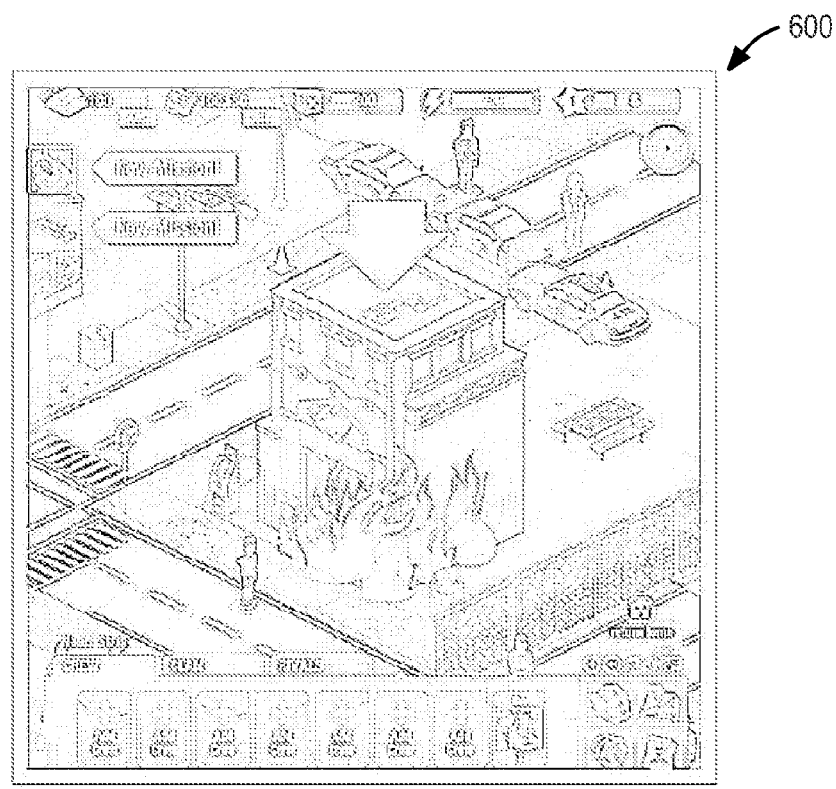
FIG. 6A illustrates an example user interface for presenting an in-game effect to a player of the virtual game.

FIG. 6A illustrates an example display 600 of an in-game effect that presents a burning building to the player of virtual game. In some embodiments, the client device 104 presents the in-game effect provided by the display 600 to the player by executing the event script listed in Table 1 when the player's avatar enters tile {16, 16},

TABLE 2

| | |
|---|---|
| 1 | const smallCasino = 200; |
| 2 | event.target.itemId = smallCasino; |
| 3 | event.target.job.remove; |

Table 2 shows source code for an example event script that causes the computing device to remove the burning building in-game effect. In some embodiments, the event script is executed by the client device 104 during operation 208, or by the game networking system 108.2 during operation 258. The event script includes a set of statements that are executed unconditionally to remove a current effect script on a building with an item ID of 200. Moreover, the statements listed in Table 2 do not include a keep-alive statement for this event script, which causes the client device 104 to disable this event script after executing the event script.

Figure 6B:
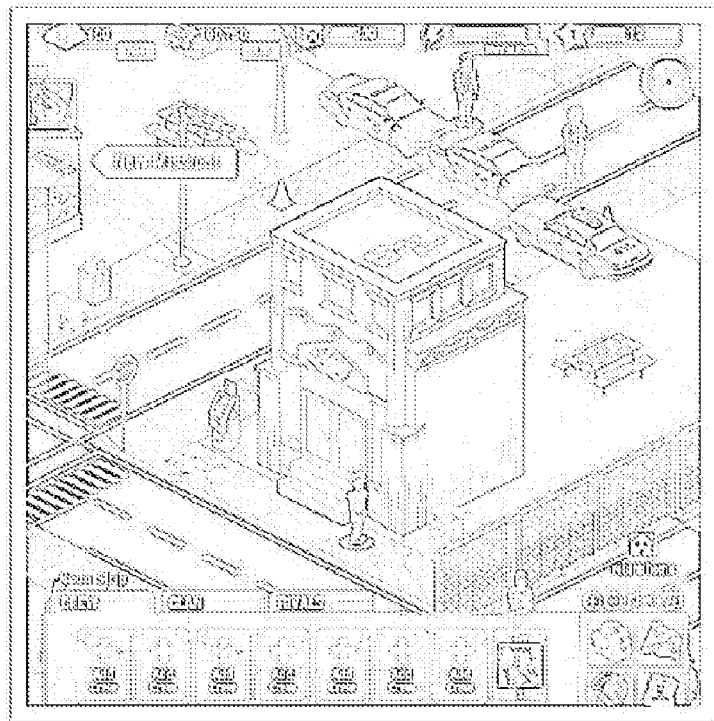
FIG. 6B illustrates an example user interface for presenting an in-game effect to the player.

FIG. 6B illustrates an example display 650 presented to the player of the virtual game. In some embodiments, the client device 104 presents the display 650 to the player by executing the event script listed in Table 2, which removes the burning-building effect of the display 600.

Figure 7:
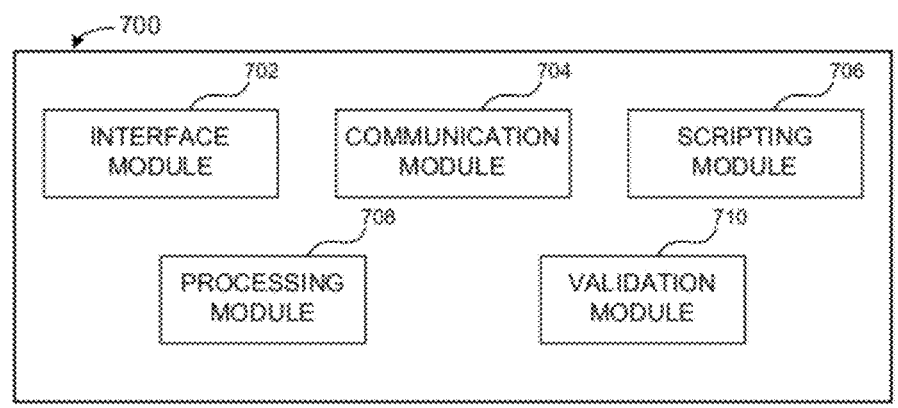
FIG. 7 illustrates an example apparatus in accordance with various example embodiments.

FIG. 7 illustrates an example apparatus 700 in accordance with various example embodiments. The apparatus 700 may include an interface module 702, a communication module 704, a scripting module 706, a processing module 708, and a validation module 710.

In some embodiments, the modules 702-708 may be implemented using one or more application-specific integrated circuit components, microprocessors, graphics processing units (GPUs), field-programmable gate arrays (FPGAs), or any combination thereof. In other embodiments, the apparatus 700 may include a server-side computing device and/or a client side computing device, and the modules 702-708 may include executable code that is stored within a computer-readable storage medium of the apparatus 700 and executed by a processing unit of the apparatus 700.

The interface module 702 may generate graphical user interfaces and/or text-based user interfaces to interact with the player. For example, the interface module 702 may generate a game interface display that receives in-game actions from the player, and displays in-game effects to the player.

The communication module 704 may send or receive an update notification that indicates an in-game action performed by the player and client-side game state information. Moreover, the communication module 704 may send or receive an update response that includes a game resource associated with an in-game effect of the virtual game.

The scripting module 706 may determine an event script to execute based on an in-game action performed by the player of the virtual game.

The processing module 708 may execute the event script to cause the interface module 702 to present the in-game effect to the player, and to update a client-side game state or a secure game state.

The validation module 710 may determine whether the client-side game state information does not match the secure game state, or whether the player does not have access to perform the in-game action.

Example Game Systems, Social Networks, and Social Graphs

In an online multiplayer game, players control player characters (PCs), a game engine controls non-player characters (NPCs), and the game engine also manages player character state and tracks state for currently active (e.g., online) players and currently inactive (e.g., offline) players. A player character may have a set of attributes and a set of friends associated with the player character. As used herein, the terms "state" and "attributes" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a player (or a group of more than one players), the game engine may take into account the state of the player character (or group of PCs) that is playing, but also the state of one or more PCs of offline/inactive players who are connected to the current player (or PC, or group of PCs) through the game social graph but are not necessarily involved in the game at the time.

For example, Player A with six friends on his team (e.g., the friends that are listed as being in the player's mob/gang/set/army/business/crew/etc. depending on the nature of the game) may be playing the virtual game and choose to confront Player B who has 20 friends on her team. In some embodiments, a player may only have first-degree friends on his or her team. In other embodiments, a player may also have second-degree and higher degree friends on his or her team. To resolve the game event, in some embodiments the game engine may total up the weapon strength of the seven members of Player A's team and the weapon strength of the 21 members of Player B's team and decide an outcome of the confrontation based on a random variable applied to a probability distribution that favors the side with the greater total. In some embodiments, all of this may be done without any other current active participants other than Player A (e.g., Player A's friends, Player, and Player B's friends could all be offline or inactive). In some embodiments, the friends in a player's team may see a change in their state as part of the outcome of the game event. In some embodiments, the state (assets, condition, level) of friends beyond the first degree are taken into account.

Example Game Networking Systems

A virtual game may be hosted by the game networking system 108.2, which can be accessed using any suitable connection 110 with a suitable client device 104. A player may have a game account on the game networking system 108.2, wherein the game account may contain a variety of information associated with the player the player's personal information, financial information, purchase history, player character state, game state, etc.). In some embodiments, a player may play multiple games on the game networking system 108.2, which may maintain a single game account for the player with respect to the multiple games, or multiple individual game accounts for each game with respect to the player. In some embodiments, the game networking system 108.2 may assign a unique identifier to a player 102 of a virtual game hosted on the game networking system 108.2. The game networking system 108.2 may determine that the player 102 is accessing the virtual game by reading the user's cookies, which may be appended to HTTP requests transmitted by the client device 104, and/or by the player 102 logging onto the virtual game.

In some embodiments, the player 102 may access a virtual game and control the game's progress via the client device 104 (e.g., by inputting commands to the game at the client device). The client device 104 can display the game interface, receive inputs from the player 102, transmit user inputs or other events to the game engine, and receive instructions from the game engine. The game engine can be executed on any suitable system (such as, for example, the client device 104, the social networking system 108.1, or the game networking system 108.2). For example, the client device 104 may download client components of a virtual game, which are executed locally, while a remote game server, such as the game networking system 108.2, provides backend support for the client components and may be responsible for maintaining application data of the game, processing the inputs from the player, updating and/or synchronizing the game state based on the game logic and each input from the player, and transmitting instructions to the client device 104. As another example, when the player 102 provides an input to the game through the client device 104 (such as, for example, by typing on the keyboard or clicking the mouse of the client device 104), the client components of the game may transmit the player's input to the game networking system 108.2.

In some embodiments, the player 102 may access particular game instances of a virtual game. A game instance is a copy of a specific game play area that is created during runtime. In some embodiments, a game instance is a discrete game play area where one or more players 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific players. A game instance is associated with a specific player when one or more game parameters of the game instance are associated with the specific player. For example, a game instance associated with a first player may be named "First Player's Play Area." This game instance may be populated with the first player's PC and one or more in-game objects associated with the first player.

In some embodiments, a game instance associated with a specific player may only be accessible by that specific player. For example, a first player may access a first game instance when playing a virtual game, and this first game instance may be inaccessible to all other players. In other embodiments, a game instance associated with a specific player may be accessible by one or more other players, either synchronously or asynchronously with the specific player's game play. For example, a first player may be associated with a first game instance, but the first game instance may be accessed by all first-degree friends in the first player's social network.

In some embodiments, the set of in-game actions available to a specific player may be different in a game instance that is associated with this player compared to a game instance that is not associated with this player. The set of in-game actions available to a specific player in a game instance associated with this player may be a subset, superset, or independent of the set of in-game actions available to this player in a game instance that is not associated with him. For example, a first player may be associated with Blackacre Farm in an online farming game, and may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In some embodiments, a game engine may interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a player or player character in an online multiplayer game.

In some embodiments, the social graph is managed by the game networking system 108.2, which is managed by the game operator. In other embodiments, the social graph is part of a social networking system 108.1 managed by a third-party (e.g., Facebook, Friendster, Myspace). In yet other embodiments, the player 102 has a social network on both the game networking system 108.2 and the social networking system 108.1, wherein the player 102 can have a social network on the game networking system 108.2 that is a subset, superset, or independent of the player's social network on the social networking system 108.1. In such combined systems, game network system 108.2 can maintain social graph information with edge type attributes that indicate whether a given friend is an "in-game friend," an "out-of-game friend," or both. The various embodiments disclosed herein are operable when the social graph is managed by the social networking system 108.1, the game networking system 108.2, or both.

Example Systems and Methods

Figure 8:
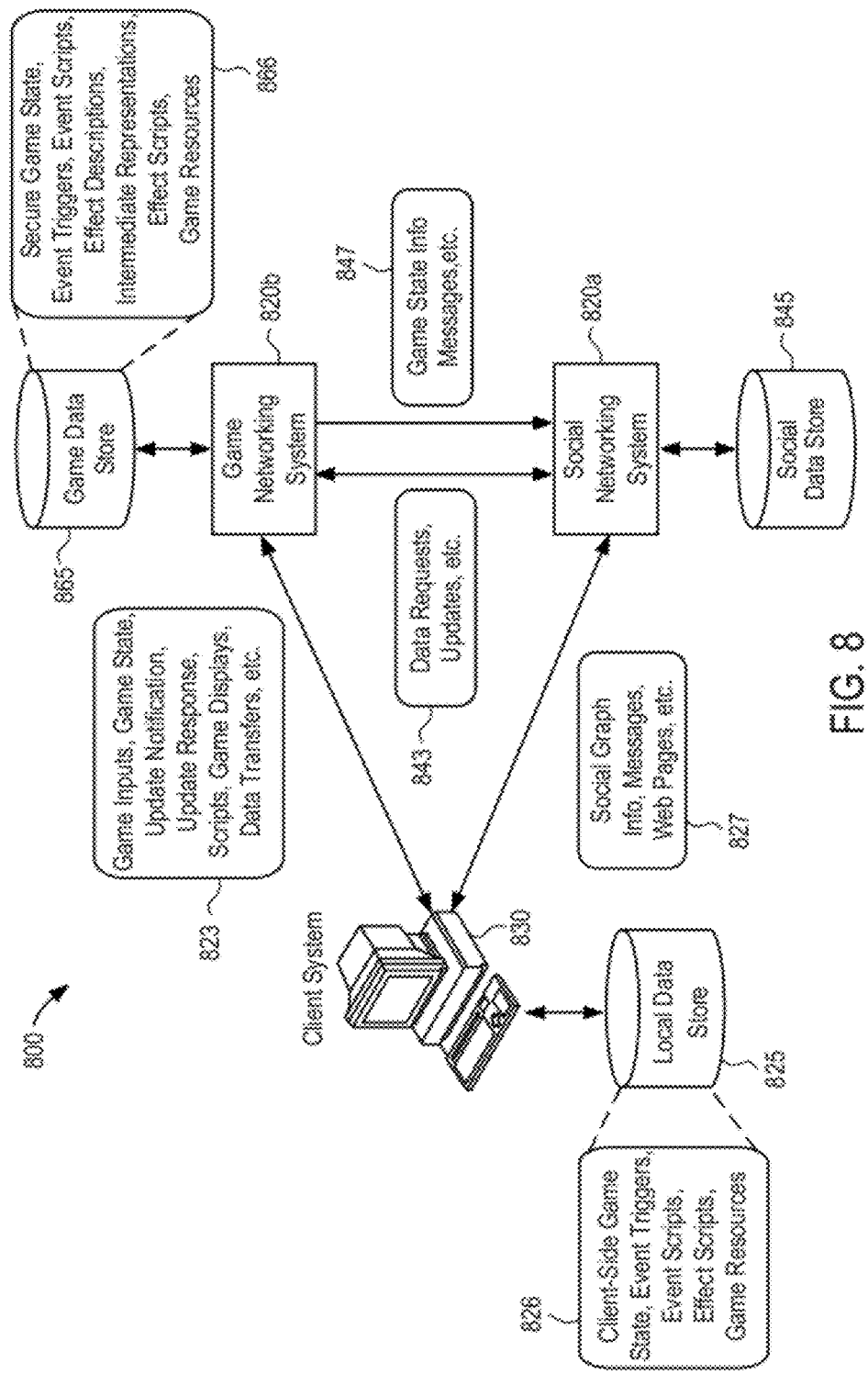
FIG. 8 illustrates an example data flow between example components of the example system of FIG. 1.

FIG. 8 illustrates an example data flow between example components of the example system of FIG. 1. One or more of the components of the example system 800 may correspond to one or more of the components of the example system 100. In some embodiments, system 800 can include client system 830, social networking system 820*a*, and game networking system 820*b*. The components of system 800 can be connected to each other in any suitable configuration, using any suitable type of connection. The components may be connected directly or over any suitable network. Client system 830, social networking system 820a, and game networking system 820b may have one or more corresponding data stores such as local data store 825, social data store 845, and game data store 865, respectively. For example, local data store 825 may store client-side information, including a client-side game state, event triggers, event scripts, effect scripts, game resources, and other suitable data. Moreover, game data store 865 may store server-side information, including a secure game state, event triggers, event scripts, effect descriptions, intermediate representations for in-game effects, effect scripts, game resources, and other suitable data.

Social networking system 820a and game networking system 820b may also have at least one server that may communicate with client system 830 over an appropriate network. Social networking system 820a and game networking system 820b may have, for example, one or more interact servers for communicating with client system 830 via the Internet. Similarly, social networking system 820a and game networking system 820b may have one or more mobile servers for communicating with client system 830 via a mobile network (e.g., GSM, PCS, Wi-Fi, WPAN, etc.). In some embodiments, one server may be able to communicate with client system 830 over both the Internet and a mobile network. In other embodiments, separate servers can be used.

Client system 830 may receive and transmit data 823 to and from game networking system 820b. This data can include, for example, a web page, a message, a game input, a game display, a MIT packet, a data request, transaction information, an update notification, an update response, an executable script, and other suitable data. At some other time, or at the same time, game networking system 820b may communicate data 843, 847 (e.g., game state information, game system account information, page info, messages, data requests, updates, etc.) with other networking systems, such as social networking system 820a (e.g., Facebook, Myspace, etc.). Client system 830 can also receive and transmit data 827 to and from social networking system 820a. This data can include, for example, web pages, messages, social graph information, social network displays, HTTP packets, data requests, transaction information, updates, and other suitable data.

Communication between client system 830, social networking system 820a, and game networking system 820b can occur over any appropriate electronic communication medium or network using any suitable communications protocols. For example, client system 830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In some embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In some embodiments, a client request may cause a server to respond with a first data object, such as an HTML page, which itself refers to other data objects. A client application, such as a browser, will request these additional data objects as it parses or otherwise processes the first data object.

In some embodiments, an instance of an online game can be stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a player accesses an online game on game networking system 820b, the BLOB containing the game state for the instance corresponding to the player may be transmitted to client system 830 for use by a client-side executed object to process. In some embodiments, the client-side executable may be a FLASH-based game, which can de-serialize the game state data in the BLOB. As a player plays the game, the game logic implemented at client system 830 maintains and modifies the various game state parameters locally. The client-side game logic may also batch game events, such as mouse clicks, and transmit these events to game networking system 820b. Game networking system 820b may itself operate by retrieving a copy of the BLOB from a database or an intermediate memory cache (memcache) layer. Game networking system 820b can also de-serialize the BLOB to resolve the game state parameters and execute its own game logic based on the events in the batch file of events transmitted by the client to synchronize the game state on the server side. Game networking system 820b may then re-serialize the game state, now modified into a BLOB, and pass this to a memory cache layer for lazy updates to a persistent database.

In some embodiments, the virtual game may be a text-based or turn-based game implemented as a series of web pages that are generated after a player selects one or more actions to perform. The web pages may be displayed in a browser client executed on client system 830. For example, a client application downloaded to client system 830 may operate to serve a set of web pages to a player. As another example, the virtual game may be an animated or rendered game executable as a stand-alone application or within the context of a webpage or other structured document. In some embodiments, the virtual game may be implemented using Adobe Flash-based technologies. As an example, a game may be fully or partially implemented as a SWF object that is embedded in a web page and executable by a Flash media player plug-in. In some embodiments, one or more described web pages may be associated with or accessed by social networking system 820a. This disclosure contemplates using any suitable application for the retrieval and rendering of structured documents hosted by any suitable network-addressable resource or website.

Application event data of a game is any data relevant to the game (e.g., player inputs). In some embodiments, each application datum may have a name and a value, and the value of the application datum may change (e.g., be updated) at any time. When an update to an application datum occurs at client system 830, either caused by an action of a game player or by the game logic itself, client system 830 may need to inform game networking system 820b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In some embodiments, client system 830 may include a Flash client. The Flash client may be configured to receive and run Flash application or game object code from any suitable networking system (such as, for example, social networking system 820*a* or game networking system 820*b*). In some embodiments, the Flash client may be run in a browser client executed on client system 830. A player can interact with Flash objects using client system 830 and the Flash client. The Flash objects can represent a variety of in-game objects. Thus, the player may perform various in-game actions on various in-game objects by making various changes and updates to the associated Flash objects.

In some embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In some embodiments, when the player makes a change to a Flash object representing an in-game object, the client-executed game logic may update one or more game state parameters associated with the in-game object. To ensure synchronization between the Flash object shown to the player at client system 830, the Flash client may send the events that caused the game state changes to the in-game object to game networking system 820*b*. However, to expedite the processing and hence the speed of the overall gaming experience, the Flash client may collect a batch of some number of events or updates into a batch file. The number of events or updates may be determined by the Flash client dynamically or determined by game networking system 820*b* based on server loads or other factors. For example, client system 830 may send a batch file to game networking system 820*b* whenever 50 updates have been collected or after a threshold period of time, such as every minute.

As used herein, the term "application event data" may refer to any data relevant to the virtual game application that may affect one or more game state parameters, including, for example and without limitation, changes to player data or metadata, changes to player social connections or contacts, player inputs to the game, and events generated by the game logic. In some embodiments, each application datum may have a name and a value. The value of an application datum may change at any time in response to the game play of a player or in response to the game engine (e.g., based on the game logic). In some embodiments, an application data update occurs when the value of a specific application datum is changed.

In some embodiments, when a player plays an online game on client system 830, game networking system 820*b* may serialize all the game-related data, including, for example and without limitation, game states, game events, and user inputs for this particular user and this particular game into a BLOB and stores the BLOB in a database. The BLOB may be associated with an identifier that indicates that the BLOB contains the serialized game-related data for a particular player and a particular online game. In some embodiments, while a player is not playing the online game, the corresponding BLOB may be stored in the database. This enables a player to stop playing the game at any time without losing the current state of the game the player is in. When a player resumes playing the game next time, game networking system 820*b* may retrieve the corresponding BLOB from the database to determine the most-recent values of the game-related data. In some embodiments, while a player is playing the online game, game networking system 820*b* may also load the corresponding BLOB into a memory cache so that the game system may have faster access to the BLOB and the game-related data contained therein.

Figure 9:
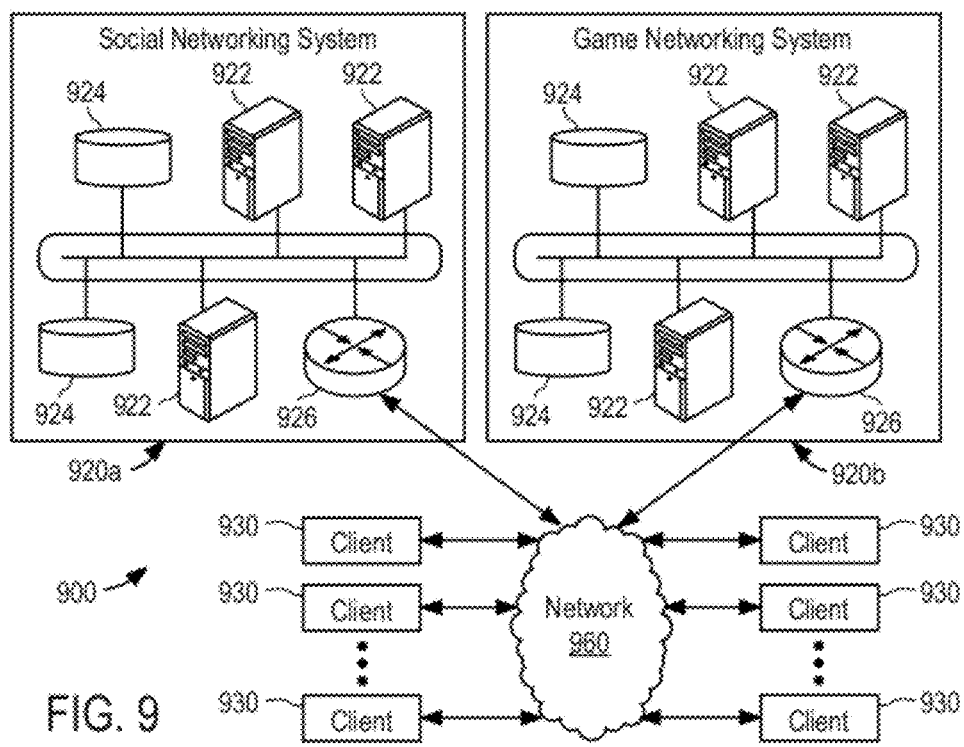
FIG. 9 illustrates an example network environment, in which various example embodiments may operate.

Various embodiments may operate in a wide area network environment, such as the Internet, including multiple network addressable systems. FIG. 9 illustrates an example network environment 900, in which various example embodiments may operate. Network cloud 960 generally represents one or more interconnected networks, over which the systems and hosts described herein can communicate. Network cloud 960 may include packet-based wide area networks (such as the Internet), private networks, wireless networks, satellite networks, cellular networks, paging networks, and the like. As FIG. 9 illustrates, various embodiments may operate in a network environment 900 comprising one or more networking systems, such as a social networking system 920*a*, a game networking system 920*b*, and one or more client systems 930. The components of the social networking system 920*a* and the game networking system 920*b* operate analogously; as such, hereinafter they may be referred to simply as the networking system 920. The client systems 930 are operably connected to the network environment 900 via a network service provider, a wireless carrier, or any other suitable means.

The networking system 920 is a network addressable system that, in various example embodiments, comprises one or more physical servers 922 and data stores 924. The one or more physical servers 922 are operably connected to computer network cloud 960 via, by way of example, a set of routers and/or networking switches 926. In an example embodiment, the functionality hosted by the one or more physical servers 922 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 922 may host functionality directed to the operations of the networking system 920. Hereinafter servers 922 may be referred to as server 922, although the server 922 may include numerous servers hosting, for example, the networking system 920, as well as other content distribution servers, data stores, and databases. Data store 924 may store content and data relating to, and enabling, operation of, the networking system 920 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc.

Logically, data store 924 corresponds to one or more of a variety of separate and integrated databases, such as relational databases and object-oriented databases, that maintain information as an integrated collection of logically related records or files stored on one or more physical systems. Structurally, data store 924 may generally include one or more of a large class of data storage and management systems. In some embodiments, data store 924 may be implemented by any suitable physical system(s) including components, such as one or more database servers, mass storage media, media library systems, storage area networks, data storage clouds, and the like. In one example embodiment, data store 924 includes one or more servers, databases (e.g., MySQL), and/or data warehouses. Data store 924 may include data associated with different networking system 920 users and/or client systems 930.

The client system 930 is generally a computer or computing device including functionality for communicating (e.g., remotely) over a computer network. The client system 930 may be a desktop computer, laptop computer, personal digital assistant (PDA), in- or out-of-car navigation system, smart phone or other cellular or mobile phone, or mobile gaming device, among other suitable computing devices. Client system 930 may execute one or more client applications, such as a Web browser.

When a user at a client system 930 desires to view a particular webpage (hereinafter also referred to as target structured document) hosted by the networking system 920, the user's web browser, or other document rendering engine or suitable client application, formulates and transmits a request to the networking system 920. The request generally includes a URL or other document identifier as well as metadata or other information. By way of example, the request may include information identifying the user, a timestamp identifying when the request was transmitted, and/or location information identifying a geographic location of the user's client system 930 or a logical network location of the user's client system 930.

Although the example network environment 900 described above and illustrated in FIG. 9 is described with respect to the social networking system 920a and the game networking system 920b, this disclosure encompasses any suitable network environment using any suitable systems. For example, the network environment may include online media systems, online reviewing systems, online search engines, online advertising systems, or any combination of two or more such systems.

Figure 10:
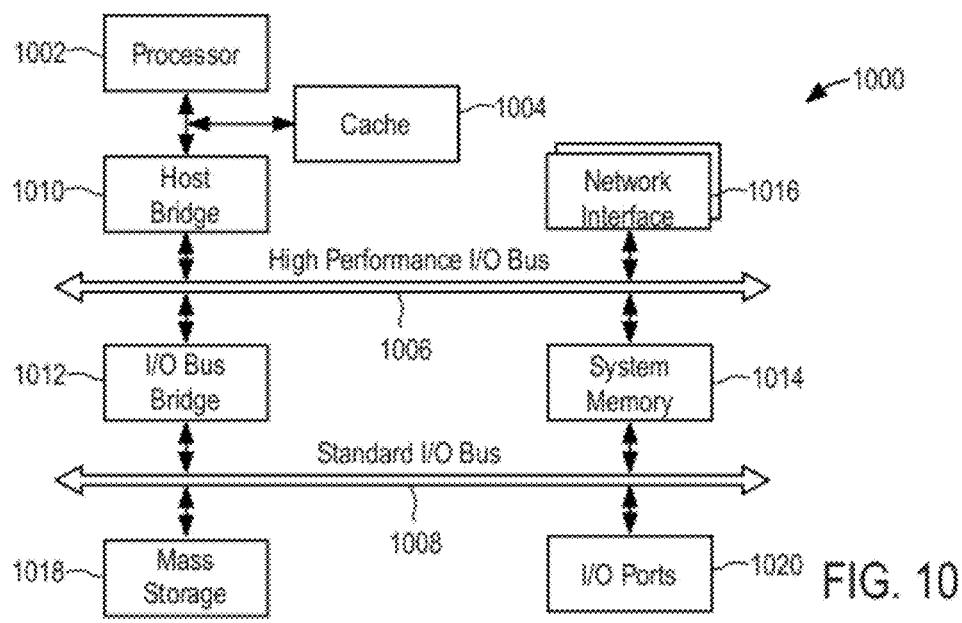
FIG. 10 illustrates an example computing system architecture, which may be used to implement one or more of the methodologies described herein.

FIG. 10 illustrates an example computing system architecture, which may be used to implement a server 922 or a client system 930. In one embodiment, the hardware system 1000 comprises a processor 1002, a cache memory 1004, and one or more executable modules and drivers, stored on a tangible computer readable medium, directed to the functions described herein. Additionally, the hardware system 1000 may include a high performance input/output (I/O) bus 1006 and a standard I/O bus 1008. A host bridge 1010 may couple the processor 1002 to the high performance I/O bus 1006, whereas the I/O bus bridge 1012 couples the two buses 1006 and 1008 to each other. A system memory 1014 and one or more network/communication interfaces 1016 may couple to the bus 1006. The hardware system 1000 may further include video memory (not shown) and a display device coupled to the video memory. Mass storage 1018 and I/O ports 1020 may couple to the bus 1008. The hardware system 1000 may optionally include a keyboard, a pointing device, and a display device (not shown) coupled to the bus 1008. Collectively, these elements are intended to represent a broad category of computer hardware systems.

The elements of the hardware system 1000 are described in greater detail below. In particular, the network interface 1016 provides communication between the hardware system 1000 and any of a wide range of networks, such as an Ethernet (e.g., IEEE 802.3) network, a backplane, etc. The mass storage 1018 provides permanent storage for the data and programming instructions to perform the above-described functions implemented in servers 922 of FIG. 9, whereas system memory 1014 (e.g., DRAM) provides temporary storage for the data and programming instructions when executed by the processor 1002. I/O ports 1020 are one or more serial and/or parallel communication ports that provide communication between additional peripheral devices, which may be coupled to the hardware system 1000.

The hardware system 1000 may include a variety of system architectures and various components of the hardware system 1000 may be rearranged. For example, cache memory 1004 may be on-chip with the processor 1002. Alternatively, the cache memory 1004 and the processor 1002 may be packed together as a "processor module," with processor 1002 being referred to as the "processor core." Furthermore, certain embodiments of the present disclosure may neither require nor include all of the above components. For example, the peripheral devices shown coupled to the standard I/O bus 1008 may couple to the high performance I/O bus 1006. In addition, in some embodiments, only a single bus may exist, with the components of the hardware system 1000 being coupled to the single bus. Furthermore, the hardware system 1000 may include additional components, such as additional processors, storage devices, or memories.

An operating system manages and controls the operation of the hardware system 1000, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
determining at a client device that a user of a virtual game has performed an in-game action;
determining at the client device a first event script to execute in response to the in-game action;
executing in the client device the first event script to present an in-game effect to the user;
sending from the client device, after the executing of the first event script, an update notification to a server computer, the update notification indicating the in-game action and client-side game state information representing a game state of the virtual game in the client device prior to the in-game action; and
receiving at the client device an update response from the server computer based on the server computer attempting to validate the update notification responsive to the in-game action, the update response indicating whether the update notification sent to the server computer is valid.

2. The method of claim 1, the determining of the first event script comprising:
determining that the in-game action satisfies a triggering condition of an event trigger for the virtual game; and
determining that the event trigger indicates that the first event script is to be executed based on the triggering condition.

3. The method of claim 1, the first event script comprising a call to an effect script for the in-game effect, and the executing of the first event script comprising executing the effect script to generate updated client-side game state information, and to present the in-game effect to the user.

4. The method of claim 1, further comprising:
determining that the executing of the first event script did not include processing a keep-alive statement; and
configuring the first event script to become disabled based on the determining that the executing of the first event script did not include the processing of the keep-alive statement.

5. The method of claim 1, the update response including an indication that the client-side game state information is invalid; and
the method further comprising performing a remedial action at the client device based on the indication that the client-side game state information is invalid.

6. The method of claim 5, the performing of the remedial action comprising:
notifying the user that an error has occurred; and
terminating the virtual game at the client device.

7. The method of claim 1, the in-game action including an action selected from the group consisting of:
entry of a new in-game location by the user's avatar;
a determinable amount of user progress at an in-game job;
commencement of a quest by the user;
completion of a quest by the user; and
clicking on an in-game object by the user.

8. A method comprising:
receiving at a server computer an update notification from a client device, the update notification indicating an in-game action performed by a user of the virtual game, and further indicating client-side game state information representing a game state of the virtual game in the client device prior to the in-game action;
determining in the server computer whether the client-side game state information does not match a secure game state in the server computer;
returning a first update response from the server computer to the client device indicating invalidity of the update notification responsive to the client-side game state information not matching the secure game state;
determining in the server computer whether the user is allowed to perform the in-game action;
returning a second update response from the server computer to the client device indicating invalidity of the update notification responsive to the user not being allowed to perform the in-game action;
determining in the server computer, responsive to the update notification being valid, a first event script to execute based on the in-game action; and
executing in the server computer the first event script to update the secure game state.

9. The method of claim 8, a second event script to be executed on the client device including a copy of the first event script.

10. The method of claim 8, the determining of the first event script comprising:
determining that the in-game action satisfies a triggering condition of an event trigger for the virtual game; and
determining that the event trigger indicates that the first event script is to be executed based on the triggering condition.

11. The method of claim 8, comprising:
receiving an effect description for the in-game effect;
generating an intermediate representation for the effect description;
generating a server-side effect script for the in-game effect based on the intermediate representation, the server-side effect script including a first set of operations that are to be executed by the server computer to update the secure game state;
generating a client-side effect script for the in-game effect based on the intermediate representation, the client-side effect script including a second set of operations that are to be executed by the client device to present the in-game effect to the user; and transmitting the client-side effect script to the client device.

12. The method of claim 11, the first event script including a call to an effect script for the in-game effect, and the executing of the first event script comprising executing the first set of operations of the server-side effect script.

13. The method of claim 11, further comprising sending an update response to the client device responsive to the update notification being valid, the update response including the second event script and the client-side effect script, the second event script including a call to the client-side effect script.

14. An apparatus comprising:
a scripting module to determine that a user of a virtual game has performed an in-game action, and to determine a first event script to execute based on the in-game action;
a processing module to execute the first event script to present an in-game effect to the user; and
a communication module to send, after the executing of the first event script, an update notification to a server computer, the update notification indicating the in-game action and client-side game state information representing a game state of the virtual game in the client device prior to the in-game action;
the communication module to receive an update response from the server computer based on the server computer attempting to validate the update notification responsive to the in-game action, the update response indicating whether the update notification sent to the server computer is valid.

15. The apparatus of claim 14, the determining of the first event script comprising:
determining that the in-game action satisfies a triggering condition of an event trigger for the virtual game; and
determining that the event trigger indicates that the first event script is to be executed based on the triggering condition.

16. The apparatus of claim 14, the first event script comprising a call to an effect script for the in-game effect, and the executing of the first event script comprising executing the effect script to generate updated client-side game state information, and to present the in-game effect to the user.

17. The apparatus of claim 14, the scripting module configured to:
determine that the executing of the first event script did not include processing a keep-alive statement; and
configure the first event script to become disabled based on the determining that the executing of the first event script did not include the processing of the keep-alive statement.

18. The apparatus of claim 14, the update response comprising an indication that the client-side game state information is invalid; and
the processing module configured to perform a remedial action based on the indication that the client-side game state information is invalid.

19. The apparatus of claim 18, the performing of the remedial action comprising:
notifying the user that an error has occurred; and
terminating the virtual game.

20. The apparatus of claim 14, the in-game action comprising an action selected from a group consisting of:
entry of a new in-game location by the user's avatar;
a determinable amount of user progress at an in-game job;
commencement of a quest by the user;
completion of a quest by the user; and
clicking on an in-game object by the user.

* * * * *

UNITED STATES PATENT AND TRADEMARK OFFICE
CERTIFICATE OF CORRECTION

| | | |
|---|---|---|
| PATENT NO. | : 8,449,398 B2 | Page 1 of 2 |
| APPLICATION NO. | : 13/244847 | |
| DATED | : May 28, 2013 | |
| INVENTOR(S) | : Ray Martone | |

It is certified that error appears in the above-identified patent and that said Letters Patent is hereby corrected as shown below:

On the title page, in column 2, Item (56) under "Other Publications", line 2, delete "3pgs" and insert --3 pgs--, therefor On the title page, in column 2, Item (57) "Abstract", line 10, before "state", insert --game--, therefor In the Drawings, On Sheet 2 of 8, Figure 2A, Reference Numeral 202, line 2, delete "PERFOMED" and insert --PERFORMED--, therefor On sheet 4 of 8, Figure 5, Reference Numeral 510, line 1, delete "EFECT" and insert --EFFECT--, therefor On sheet 7 of 8, Figure 8, Reference Numeral 847, line 2, delete "Messages,etc." and insert --Messages, etc.--, therefor In the Specification, In column 4, line 46, delete "in game" and insert --in-game--, therefor In column 5, line 58, after "information", insert --(e.g.,--, therefor In column 8, in "Table 1", line 45, after "7", insert --}--, therefor In column 9, line 11, delete "16}," and insert --16}.--, therefor In column 10, line 44, delete "players", insert --player--, therefor Signed and Sealed this
Eleventh Day of November, 2014

Michelle K. Lee
*Deputy Director of the United States Patent and Trademark Office*

CERTIFICATE OF CORRECTION (continued)
U.S. Pat. No. 8,449,398 B2

In column 10, line 65, before "and", insert --B,--, therefor

In column 11, line 10, after "player", insert --(e.g.,--, therefor

In column 13, line 18, delete "interact" and insert --internet--, therefor

In column 13, line 30, delete "MIT" and insert --HTTP--, therefor

In column 18, line 45, delete "tape," insert --tapes,--, therefor